United States Patent Office 3,168,999
Patented Feb. 9, 1965

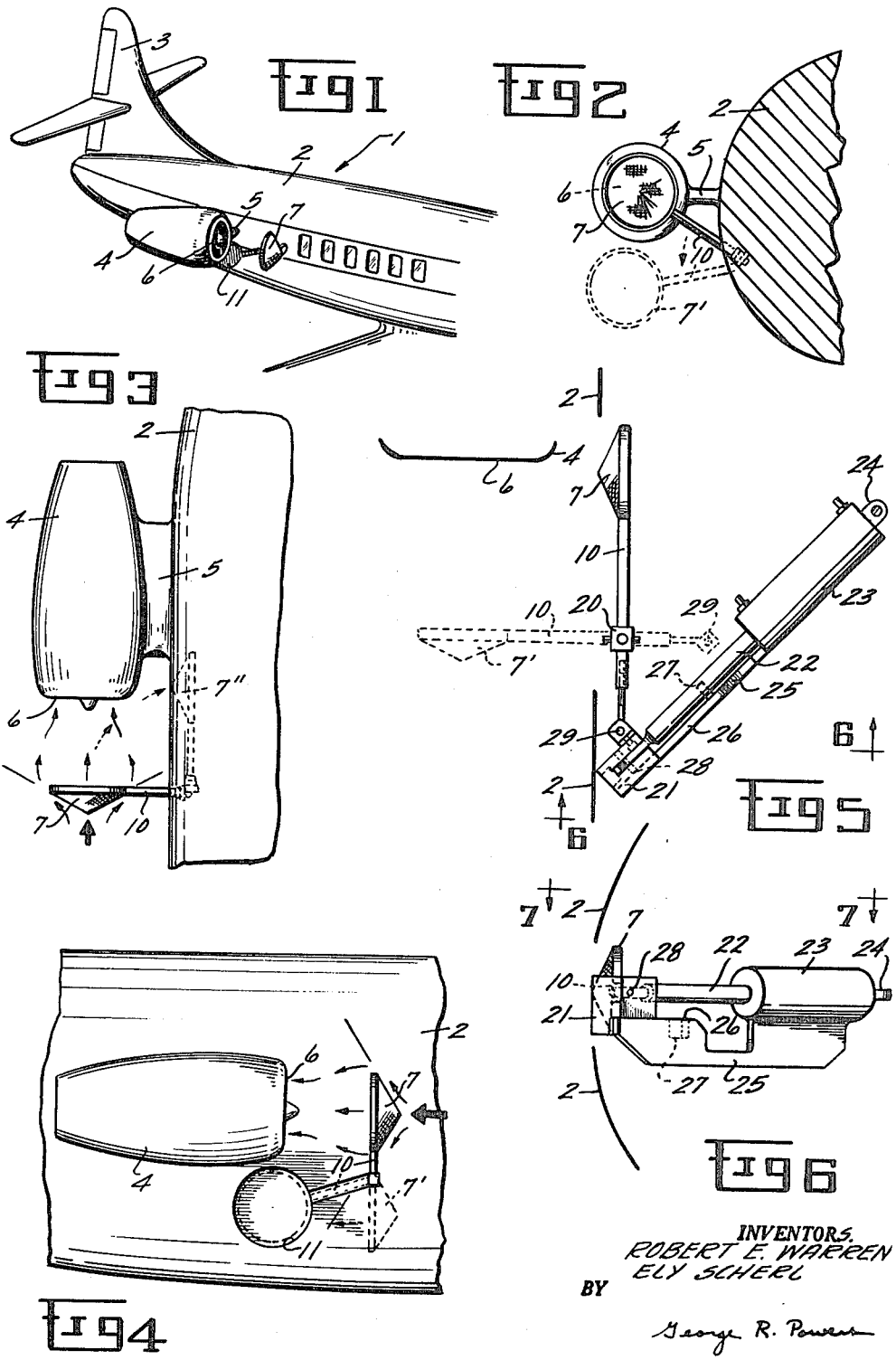

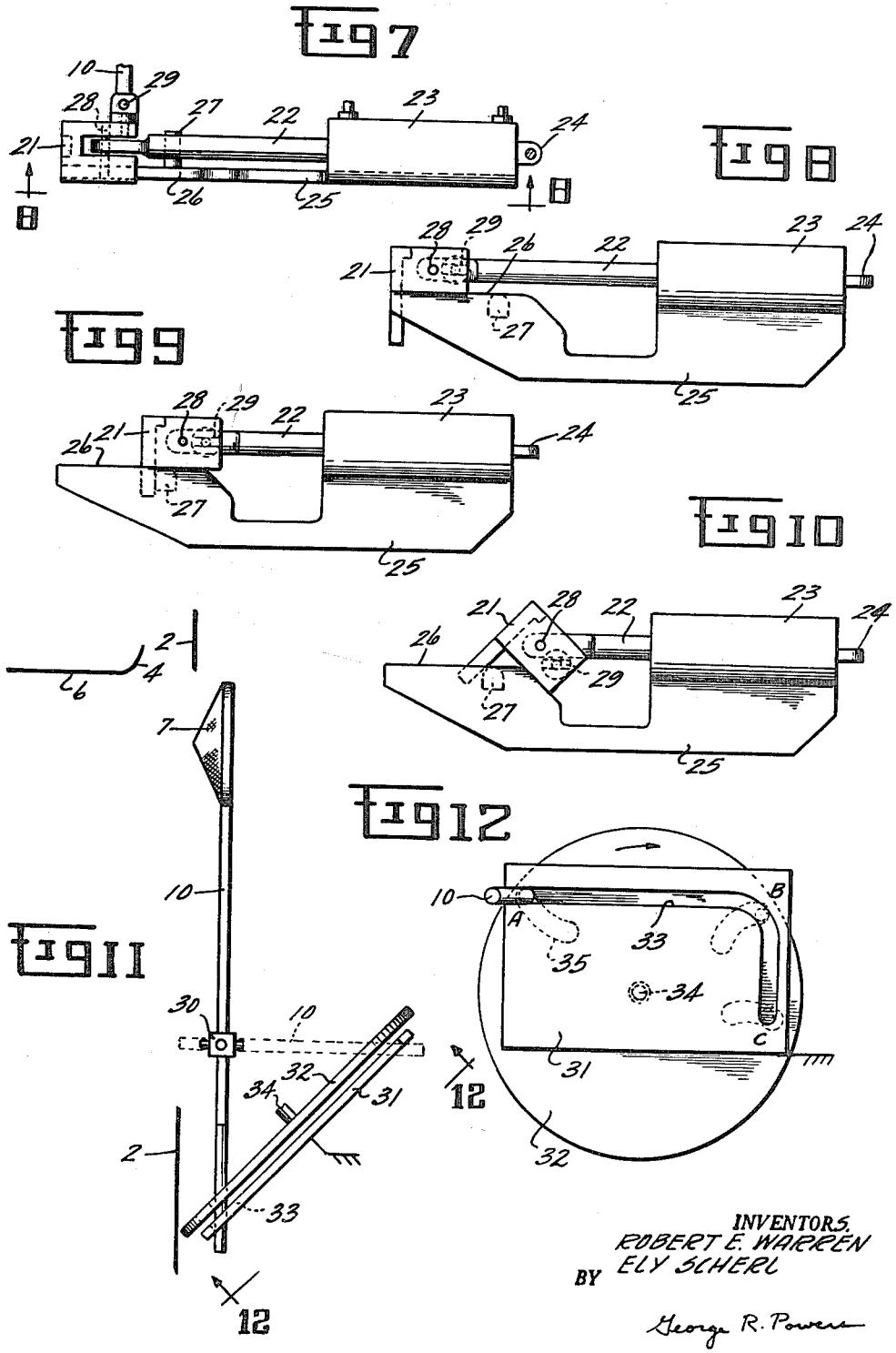

3,168,999
GAS TURBINE INLET SHIELD
Robert Evans Warren, Marblehead, and Ely Scherl, Wakefield, Mass., assignors to General Electric Company, a corporation of New York
Filed Dec. 19, 1963, Ser. No. 331,657
9 Claims. (Cl. 244—53)

This invention relates to means for preventing foreign object ingestion by an aircraft gas turbine engine and, more particularly, relates to a movable shield which is movable between an extended position aligned with and axially spaced from the inlet opening of the engine and a retracted position.

This application is a continuation-in-part of applicants' prior co-pending application entitled "Gas Turbine Inlet Shield," Serial No. 191,156, filed April 30, 1962, now abandoned, and assigned to the assignee of this invention.

Foreign objects drawn into the inlet opening of an aircraft gas turbine engine may cause loss of engine power, substantial engine damage, or even complete engine failure. Compressor failure is, for example, often caused by foreign object ingestion. Engine stall along with an accompanying loss of power may also be caused by foreign objects drawn into the engine. This ingestion of foreign objects is most likely to occur when the aircraft is on the ground or operating at low altitudes. Under such conditions, stones and other objects such as rags, paper, etc., may be picked up and thrown into the engine inlet. In addition, birds, which often congregate in the vicinity of aircraft runways, can be drawn into the engine during takeoff and landing maneuvers and thus cause engine damage or loss of power at a critical time when maximum power is required. It is therefore desirable to provide protective shield means for preventing foreign object ingestion when the aircraft is being operated on the ground or at low altitudes.

In the past, shield devices such as grids or screens covering the inlet openings of gas turbine engines have been used to prevent the entry of foreign objects. While these shield devices thus prevent extensive damage to the blading and other engine parts by ingestion of foreign objects, they may accumulate ice and trap rags, paper, or similar objects and thereby cause an undesired reduction in the rate of air flow to the engine and an accompanying loss of power. In addition to the loss of engine power, the reduced air flow rate may cause engine failure due to severe over-temperature conditions in the combustor and turbine.

At usual aircraft operational altitudes, the possibility of substantial foreign object ingestion is slight since the foreign objects normally causing engine damage at lower altitudes are not present in the atmosphere at the higher altitudes. Therefore, since a shield covering the inlet opening of a gas turbine engine produces an undesired pressure drop and thereby reduces engine efficiency, it is advantageous to retract the shield at higher operational altitudes where the possibility of engine damage is slight. In practice, however, it is difficult and often impossible to retract from the inlet opening a shield on which ice or other foreign objects have collected due to obstruction of either the retracting mechanism or the shield itself. Even where it is physically possible to retract the shield, it may be undesirable to do so due to the possibility of dumping the foreign objects which have accumulated thereon into the engine inlet opening. When it is either impossible or undesirable to retract a protective shield at operational altitudes, maximum engine power cannot be attained due to the restricted air flow. At the same time, the reduction in the air flow may cause over-temperature conditions to exist in the combustor and turbine.

It is therefore a primary object of this invention to provide improved means for preventing foreign object ingestion by an aircraft gas turbine engine while permitting substantially unobstructed flow of air to the gas turbine inlet.

It is a further object of this invention to prevent foreign object ingestion by shield means which can be retracted easily from the engine inlet opening whenever desired.

It is a still further object of this invention to provide retractable shield means which can be retracted from the engine inlet opening without dumping foreign objects which have accumulated thereon into the inlet.

Briefly stated, in accordance with one embodiment of this invention, a protective shield is axially spaced from the inlet opening of an aircraft gas turbine engine mounted on an airframe. The shield, having a cross-sectional area substantially as great as the inlet opening, is positioned in overlapping relationship to the inlet at a preselected distance from the inlet. The distance selected is one at which the air flow to the engine is substantially unobstructed by the protective shield and also at which the shield effectively deflects foreign objects from the inlet opening. Also in accordance with this invention, actuating means are provided for positioning the shield at the preselected distance from the inlet opening and for retracting the shield from its overlapping relationship with the inlet in a plane perpendicular to the direction of air flow such that foreign objects accumulated on the shield are not dumped into the inlet opening.

While the specification concludes with claims particularly pointing out and distinctly claiming the subject matter regarded as the invention, it is believed that the invention, together with further objects and advantages, may best be understood by reference to the following description taken in connection with the accompanying drawing in which:

FIG. 1 is a partial perspective view of an airframe on which a gas turbine engine and the protective shield of this invention are mounted;

FIG. 2 is a front view of the engine and the shield showing in solid lines the overlapping relationship of the engine inlet opening and the shield, an intermediate position of the shield being shown by broken lines;

FIG. 3 is a top view of the structure shown in FIG. 2, the fully retracted position of the shield being shown by broken lines;

FIG. 4 is a side view of the structure shown in FIG. 2, both the intermediate position and the fully retracted position of the shield being shown by broken lines; and FIG. 5 is a view similar to FIG. 3 showing a first type of actuating means and the shield in its retracted position, the overlapping position of the shield being shown by broken lines;

FIG. 6 is a view taken along line 6—6 of FIG. 5;

FIG. 7 is a view of the actuating means taken along line 7—7 of FIG. 6, the actuating means positioned to place the shield in its retracted position;

FIG. 8 is a view taken along line 8—8 of FIG. 7;

FIGS. 9 and 10 are views similar to FIG. 8 showing the actuating means positioned to place the shield in its intermediate and overlapping positions, respectively;

FIG. 11 is a view similar to FIG. 5 illustrating a second type of actuating means; and FIG. 12 is a view taken along line 12—12 of FIG. 11

Referring first to FIG. 1, a portion of an airframe 1 is shown comprising a fuselage 2 and a tail assembly 3. A nacelle 4 containing a gas turbine engine is mounted on the side of the fuselage 2 in the vicinity of the tail assembly 3. As shown more clearly in FIGS. 2 and 3, a pylon 5 supports the nacelle 4 from the fuselage 2. Returning to FIG. 1, an inlet opening 6 is provided at the forward end of the nacelle 4 through which combustion air is supplied to the gas turbine engine. A protective shield 7 is axially aligned with and spaced from the inlet opening 6. As will be described in detail in a later portion of this specification, the protective shield 7 is positioned such that it deflects foreign objects from the engine inlet opening 6 without preventing an adequate flow of air to the engine. It will be understood, of course, that the airframe 1 is also provided with a second engine containing nacelle and a second protective shield on the opposite side of the fuselage 2. It should not, however, be assumed that the protective shield of this invention can only be used in connection with the particular engine configuration illustrated. Many engine mounting configurations may be used; for example, more than or less than two engines may be mounted on the fuselage. Also, the protective shield may be used with wing mounted gas turbine engines.

Turning now to FIGS. 2 through 4, a strut 10 supports the protective shield 7 in axial alignment with the engine inlet opening 6. Suitable actuating means are provided for moving the shield 7 and the strut 10 in a hereinafter described manner from the axially aligned overlapping positon into a recess 11 in the fuselage 2, two embodiments of actuating means being described at a later point in this description. The shield 7 is preferably comprised of a conically shaped screen through which air can pass to the engine inlet 6 as shown by the arrows in FIGS. 3 and 4. During flight, foreign objects such as, for example, rags, paper, or birds striking the shield 7 are deflected at an angle, the inertia of the objects being sufficiently great that the objects bypass the engine rather than being drawn into the low pressure area in front of the inlet opening 6. The shield 7 has a cross-sectional area substantially as great as the inlet opening 6 so that an object which just misses the shield 7 and is not deflected thereby is not drawn into the engine inlet opening 6.

Although the protective shield 7 is preferably of conical shape, objects such as, for example, papers or rags may occasionally lodge on the shield. Since an inadequate flow of air to the engine would result in loss of power and possibly in engine failure, the shield 7 is axially spaced from the inlet opening 6 in accordance with this invention. As shown by arrows in FIGS. 3 and 4, air passing around the protective shield 7 is drawn into the low pressure area in front of the inlet 6 and provides an adequate supply of air to the engine. While an obstruction on the shield 7 may cause added drag and reduce engine efficiency somewhat, the proper axial spacing between the inlet opening 6 and the shield assures that there will not be a substantial loss of power or an overtemperature condition.

The proper spacing between the inlet opening 6 and the shield 7 depends on a number of factors. The spacing should be great enough that an adequate supply of air can flow around the shield to the engine when the screen is obstructed. The spacing must not, however, be so great that foreign objects traveling at an angle to the engine axis can just miss the shield 7 and enter the inlet opening 6. Similarly, the spacing must not be so great that objects can change their direction and enter the low pressure area in front of the inlet 6 after once being deflected by the shield 7. It is impossible to specify that any one particular distance is correct in all situations since the correct spacing will depend on the engines and aircraft involved as well as the specific aircraft application. For example, the spacing depends upon both the speed of the aircraft and the size of the inlet opening. The proper spacing may also depend upon the character of the foreign objects usually encountered. Thus, while it is impossible to state a particular spacing, it will be relatively easy for those skilled in the art to determine the proper spacing once the engine size, aircraft speed, and other pertinent information is known for any specific engine installation.

Anti-icing means are not necessary with the protective shield 7 of this invention since the conical screen can be entirely blocked with ice without causing a dangerous decrease in air flow to the engine. In practice, while the shield 7 is preferably comprised of a conical screen, it may be desirable to fabricate the shield of solid material if there is a likelihood that relatively massive objects will be encountered. Also, if desired, a flat plate or screen may be used instead of the preferred conical screen, but the possibility of foreign objects accumulating on the shield is thereby greatly increased.

As pointed out previously, the likelihood of encountering foreign objects is substantially reduced at normal operating altitudes. Also, the protective shield 7 causes drag and reduces engine efficiency somewhat at usual aircraft speeds. Therefore, it is desirable at operational altitudes and speeds to retract the shield 7 from its overlapping relationship with the engine inlet opening 6. In moving the shield from its overlapping position, care must be taken to prevent the dumping of foreign objects which may have accumulated on the shield into the engine. For this reason, actuating means are provided in accordance with the invention for retracting the shield 7 in a direction perpendicular to the air flow approaching the engine until the shield is moved out of axial alignment with the inlet opening 6. As shown in FIGS. 2 and 4, the shield 7 is moved parallel to the plane of the inlet opening 6 (also perpendicular to the direction of air flow) until it reaches the intermediate position designated by broken lines 7'. After the shield reaches position 7', the actuating means then moves the shield to the fully retracted position designated by broken lines 7" within the fuselage recess 11 as shown in FIGS. 3 and 4. Upon returning to lower altitudes, the actuating means returns the protective shield 7 to the overlapping position in front of the inlet opening 6.

The actuating means for moving the shield 7 between its extended and retracted positions has not been described. It will be obvious, however, to those skilled in the art that various mechanical, electro-mechanical, and hydraulic means may be used for moving the shield 7 in the desired pre-determined manner. Two suitable actuating means are illustrated by FIGS. 5 through 12.

Referring now to a first actuating means illustrated by FIGS. 5–10, the strut 10 supporting the shield 7 is pivotally mounted on a gimbel 20 such that the shield 7 can be moved to its various positions. The inner end of the strut 10 is pivotally connected at 29 to an L-shaped link 21 best illustrated by FIGS. 7–10. The L-shaped link 21 is pivotally connected at 28 to a shaft 22 which can be reciprocated by means of a hydraulic cylinder 23, the cylinder 23 being pivotally secured to the airframe at 24. A cam plate 25 having a cam surface 26 thereon is rigidly secured to the hydraulic cylinder 23, the L-shaped link 21 being mounted to move along the cam surface 26. The cam plate 25 also has a stop member 27 thereon which can be engaged by the L-shaped link.

With the shield 10 in its retracted position, the various elements of the actuating means are in the positions illustrated by FIGS. 5–8. If it is desired to move the shield 7 to its overlapping position, hydraulic fluid from a suitable source is supplied to the cylinder 23 to force shaft 22 to the right and move the L-shaped link 21 along the cam surface 26 until the position illustrated by FIG. 9 is reached. This movement of the L-shaped link 21 and the inner end of the strut 10 attached thereto moves the shield 7 from its retracted position to its intermediate position. With the L-shaped link 21 in the position illustrated by FIG. 9 and the shield 7 in its intermediate position, the stop member 27 prevents further movement of the link 21 along the cam surface 26. Further movement of the shaft 22 to the right causes the L-shaped link 21 to pivot about its connection 28 to the shaft 22 into the position illustrated by FIG. 10. This movement lowers the inner end of the strut 10 by lowering connection point 29 and thereby moves the shield 7 from its intermediate position into its overlapping position. This movement is in a plane perpendicular to the direction of air-flow to the engine inlet. It will be obvious to those skilled in the art that the shield 7 can be moved from its overlapping position to its retracted position by reversing the above steps.

Referring now to the second actuating means illustrated by FIGS. 11 and 12, the strut 10 is pivotally mounted on a gimbel 30, the inner end of the strut extending through cam slots in a fixed cam plate 31 and a rotatable cam plate 32. The fixed cam plate 31, as illustrated by FIG. 12, has an L-shaped cam slot 33. It will be obvious from FIGS. 11 and 12 that the position of the shield 7 is determined by the position of the strut 10 in the slot 33. In particular, the shield 7 is in its retracted position when the strut passes through the slot 33 at point A, in its intermediate position when the strut is at point B, and in its overlapping position when the strut is at point C. Therefore, it will be obvious that the shield 7 can be moved from its retracted position to its overlapping position by forcing the strut 10 along the entire length of the L-shaped slot 33 from point A to point C. Similarly, the shield 7 can be returned to its retracted position by moving the strut 10 along the slot 33 from point C to point A. The rotatable cam plate 32 is used to force the strut 10 along the cam slot 33.

As illustrated by FIG. 13, the cam plate 32 can be rotated about a central axis 34 by means of a suitable power source such as, for example, an output shaft from a gearbox attached to and driven by the gas turbine engine. The cam plate 32 has a cam slot 35 therein. With the cam plates 31 and 32 positioned as illustrated by FIG. 12, the strut 10 passes through cam slots 33 and 35 at point A, the shield 7 thus being in its retracted position. Clockwise rotation of the cam 32 as viewed in FIG. 12 will force the strut 10 to move along the entire length of the slot 33. It will be obvious that shield 7 can be returned to its retracted position by rotating the cam plate 32 in a counter clockwise direction and thus moving the strut 10 along the entire length of the cam slot 33 from point C to point A.

Therefore, while preferred embodiments of this invention have been described, it will be obvious to those skilled in the art that various changes and modifications may be made without departing from the invention. For example, the shield could be rotated about a fixed rotatable shaft in a single plane normal to the direction of air flow. Other changes and modifications will occur to those skilled in the art. It is therefore intended to cover in the appended claims all such changes and modifications as fall within the true spirit and scope of the invention.

What is claimed as new and desired to secure by Letters Patent of the United States is:

1. An aircraft gas turbine engine installation comprising a gas turbine engine, said engine having an air inlet opening at the forward end thereof, a protective shield having a cross-sectional area substantially as great as said inlet opening, said shield being movable between a retracted position and an extended position axially spaced from and in overlapping relationship with said inlet opening, and actuating means operatively connected to said shield for moving said shield between said retracted and extended positions, said actuating means adapted to move said shield in a plane perpendicular to the direction of air flow to said inlet opening when moving said shield out of said extended position, said shield thereby preventing damage to said engine by deflecting foreign objects from said inlet opening while permitting air to enter said opening when said shield is positioned in said extended position.

2. An aircraft gas turbine engine installation comprising a gas turbine engine, said engine having an air inlet opening at the forward end thereof, a protective shield, said shield being sequentially movable between a retracted position, an intermediate position, and an extended position axially aligned with and spaced from said inlet opening, both of said intermediate and extended positions being located in a common plane perpendicular to the direction of air flow to said inlet opening, and actuating means operatively connected to said shield for sequentially moving said shield between said positions, said shield thereby preventing damage to said engine by deflecting foreign objects from said inlet opening while permitting air to enter said opening when said shield is positioned in said extended position.

3. An aircraft gas turbine engine installation comprising a gas turbine engine, said engine having an air inlet opening at the forward end thereof, a protective shield, said shield being sequentially movable between a retracted position, an intermediate position, and an extended position axially aligned with and spaced a predetermined distance from said inlet opening, both of said intermediate and extended positions being located in a common plane perpendicular to the direction of air flow to said inlet opening, said preselected distance being selected from within a range of distances from said opening, the endpoint of said range nearest to said opening being the nearest distance at which said shield may be positioned without obstructing the air flow to said opening, and the endpoint of said range furthest from said opening being the furthest distance at which said shield may be positioned to effectively deflect foreign objects from said opening, and actuating means operatively connected to said shield for sequentially moving said shield between said positions, said shield thereby preventing damage to said engine by deflecting foreign objects from said inlet opening while permitting air to enter said opening when said shield is positioned in said extended position.

4. An aircraft gas turbine engine installation comprising a gas turbine engine, said engine having an air inlet opening at the forward end thereof, a protective shield having a cross-sectional area substantially as great as said inlet opening, said shield being sequentially movable between a retracted position, an intermediate position, and an extended position axially aligned with and spaced a predetermined distance from and in overlapping relationship with said inlet opening, both of said intermediate and extended positions being located in a common plane perpendicular to the direction of air flow to said inlet opening, said preselected distance being selected from within a range of distances from said opening, the endpoint of said range nearest to said opening being the nearest distance at which said shield may be positioned without obstructing the air flow to said opening and the endpoint of said range furthest from said opening being the furthest distance at which said shield may be positioned to effectively deflect foreign objects from said opening, and actuating means operatively connected to said shield for sequentially moving said shield between said positions, said shield thereby preventing damage to said engine by deflecting foreign objects from said inlet opening while permitting air to enter said opening when said shield is positioned in said extended position.

5. An aircraft gas turbine engine installation comprising an air-frame, a recess in said airframe, a gas turbine engine mounted on said airframe, said engine having an air inlet opening at the forward end thereof, a protective shield having a cross-sectional area substantially as great as said inlet opening, said shield being selectively movable between a retracted position in which said shield is located within said recess and an extended position axially spaced from and in overlapping relationship with said inlet opening, and actuating means operatively connected to said shield for moving said shield between said retracted and extended positions, said actuating means adapted to move said shield in a plane perpendicular to the direction of air flow to said inlet opening when moving said shield out of said extended position, said shield thereby preventing damage to said engine by deflecting foreign objects from said inlet opening while permitting air to enter said opening when said shield is positioned in said extended position.

6. An aircraft gas turbine engine installation comprising an airframe, a recess in said airframe, a gas turbine engine mounted on said airframe, said engine having an air inlet opening at the forward end thereof, a protective shield, said shield being sequentially movable between a retracted position in which said shield is located within said recess, an intermediate position, and an extended position axially spaced a predetermined distance aligned with and from said inlet opening, both of said intermediate and extended positions being located in a common plane perpendicular to the direction of air flow to said inlet opening, said preselected distance being selected from within a range of distances from said opening, the endpoint of said range nearest to said opening being the nearest distance at which said shield may be positioned without obstructing the air flow to said opening and the endpoint of said range furthest from said opening being the furthest distance at which said shield may be positioned to effectively deflect foreign objects from said opening, and actuating means operatively connected to said shield for sequentially moving said shield between said positions, said shield thereby preventing damage to said engine by deflecting foreign objects from said inlet opening while permitting air to enter said opening when said shield is positioned in said extended position.

7. An aircraft gas turbine engine installation comprising a gas turbine engine, said engine having an air inlet opening at the forward end thereof, a protective shield having a cross-sectional area substantially as great as said inlet opening, an elongated strut supporting at its outer end said shield, means pivotally connecting said strut to the aircraft at a position intermediate its length such that said shield can be moved sequentially between a retracted position, an intermediate position, and an extended position axially aligned with and spaced a predetermined distance from and in overlapping relationship with said inlet opening, both of said intermediate and extended positions being located in a common plane perpendicular to the direction of air flow to said inlet opening, said preselected distance being selected from within a range of distances from said opening, the endpoint of said range nearest to said opening being the nearest distance at which said shield may be positioned without obstructing the air flow to said opening and the endpoint of said range furthest from said opening being the furthest distance at which said shield may be positioned to effectively deflect foreign objects from said opening, and actuating means operatively connected to the inner end of said strut for pivoting said strut so as to move said shield sequentially between said positions, said shield thereby preventing damage to said engine by deflecting foreign objects from said inlet opening while permitting air to enter said opening when said shield is positioned in said extended position.

8. An aircraft gas turbine engine installation as defined in claim 7 in which said actuating means is comprised of a movable link pivotally connected to the inner end of said strut, a shaft pivotally connected to said link for moving said link, cam means constraining said link to movement in a predetermined manner to produce the desired movement of said shield, and means for reciprocably moving said shaft.

9. An aircraft gas turbine engine installation as defined in claim 7 in which said actuating means is comprised of a fixed cam means engaging the inner end of said strut, said fixed cam means constraining the inner end of said strut to movement in a predetermined manner to produce the desired movement of said shield, and movable cam means engaging the inner end of said strut and forcing said strut to move along said first cam means.

References Cited by the Examiner
UNITED STATES PATENTS

| | | | |
|---|---|---|---|
| 2,399,186 | 4/46 | Hunter | 60—39.09 |
| 2,482,720 | 9/49 | Sammons | 60—39.09 |
| 2,928,497 | 3/60 | Stockdale | 60—39.09 |

MILTON BUCHLER, *Primary Examiner.*

ANDREW H. FARRELL, *Examiner.*